(12) United States Patent
Shay et al.

(10) Patent No.: US 7,660,980 B2
(45) Date of Patent: Feb. 9, 2010

(54) ESTABLISHING SECURE TCP/IP COMMUNICATIONS USING EMBEDDED IDS

(75) Inventors: A. David Shay, Lawrenceville, GA (US); Joubert Berger, Atlanta, GA (US); Patricia Joy Leima, Duluth, GA (US); Jonathan Alexander, Roswell, GA (US); Chaoting Xuan, Suwanee, GA (US)

(73) Assignee: Liquidware Labs, Inc., Alpharetta, GA (US)

( * ) Notice: Subject to any disclaimer, the term of this patent is extended or adjusted under 35 U.S.C. 154(b) by 0 days.

(21) Appl. No.: 11/690,532

(22) Filed: Mar. 23, 2007

(65) Prior Publication Data

US 2007/0300290 A1 Dec. 27, 2007

Related U.S. Application Data

(63) Continuation-in-part of application No. 11/123,552, filed on May 5, 2005, now Pat. No. 7,549,159, and a continuation-in-part of application No. 10/644,632, filed on Aug. 19, 2003, now Pat. No. 7,552,323, and a continuation-in-part of application No. 10/065,775, filed on Nov. 18, 2002, now Pat. No. 7,386,889, application No. 10/690,532, which is a continuation-in-part of application No. 11/123,546, filed on May 5, 2005, now Pat. No. 7,591,001, application No. 11/690,532, which is a continuation-in-part of application No. 11/164,085, filed on Nov. 9, 2005, now abandoned.

(60) Provisional application No. 60/767,387, filed on Mar. 23, 2006, provisional application No. 60/569,922, filed on May 10, 2004, provisional application No. 60/571,360, filed on May 14, 2004, provisional application No. 60/626,578, filed on Nov. 10, 2004.

(51) Int. Cl.
*H04L 29/02* (2006.01)
*H04L 29/12* (2006.01)

(52) U.S. Cl. .............................. 713/154; 726/13; 726/14
(58) Field of Classification Search ......... 713/153–154, 713/260–163, 167–168; 726/1–4, 12–13, 726/21, 27–30
See application file for complete search history.

(56) References Cited

U.S. PATENT DOCUMENTS 5,204,961 A 4/1993 Barlow
(Continued)

FOREIGN PATENT DOCUMENTS

CA 2286534 4/2001
WO WO 02/061510 8/2002

OTHER PUBLICATIONS

International Search Report Dated Apr. 29, 2004, from Corresponding International Application No. PCT/US03/36713, Filed Nov. 17, 2003.

(Continued)

*Primary Examiner*—Jung Kim
*Assistant Examiner*—Venkat Perungavoor
(74) *Attorney, Agent, or Firm*—Seyfarth Shaw LLP

(57) ABSTRACT

Methods and systems for establishing secure TCP/IP communications for individual network connections include the steps of intercepting a conventional TCP SYN packet prior to transmission from a source node to a destination node, embedding unique identifiers into standard fields of the packet header, wherein the unique identifiers are associated with the specific connection attempt and wherein the unique identifiers identify the user account and/or the computer hardware initiating the communication attempt, then forwarding the modified TCP SYN packet to the destination node and intercepting the modified TCP SYN packet prior to arrival, determining whether secure communications are required based on the unique identifiers extracted from the packet headers, based on other TCP/IP information, and based on predefined rules associated with the same. If secure communications are required, such requirement is communicated within either an RST or a SYN-ACK back to the source node.

28 Claims, 10 Drawing Sheets

U.S. PATENT DOCUMENTS

| | | | |
|---|---|---|---|
| 5,216,675 | A | 6/1993 | Melliar-Smith et al. |
| 5,689,566 | A | 11/1997 | Nguyen |
| 5,796,942 | A | 8/1998 | Esbensen |
| 5,802,178 | A | 9/1998 | Holden et al. |
| 5,872,847 | A | 2/1999 | Boyle et al. |
| 5,956,481 | A | 9/1999 | Walsh et al. |
| 6,070,244 | A | 5/2000 | Orchier et al. |
| 6,119,171 | A | 9/2000 | Alkhatib |
| 6,219,786 | B1 | 4/2001 | Cunningham et al. |
| 6,275,942 | B1 | 8/2001 | Bernhard et al. |
| 6,279,113 | B1 | 8/2001 | Vaidya |
| 6,317,831 | B1 | 11/2001 | King |
| 6,320,874 | B1 | 11/2001 | Crump et al. |
| 6,363,489 | B1 | 3/2002 | Comay et al. |
| 6,370,648 | B1 | 4/2002 | Diep |
| 6,408,391 | B1 | 6/2002 | Huff et al. |
| 6,493,342 | B1 * | 12/2002 | Breslow et al. ............. 370/394 |
| 6,606,706 | B1 | 8/2003 | Li |
| 6,618,359 | B1 | 9/2003 | Chen et al. |
| 6,671,273 | B1 * | 12/2003 | Beck ......................... 370/389 |
| 6,742,118 | B1 | 5/2004 | Doi et al. |
| 6,772,334 | B1 | 8/2004 | Glawitsch |
| 6,873,988 | B2 | 3/2005 | Herrmann et al. |
| 6,959,184 | B1 | 10/2005 | Byers et al. |
| 6,980,658 | B1 * | 12/2005 | Rezaiifar et al. ............ 380/274 |
| 6,985,941 | B2 | 1/2006 | Schweitzer et al. |
| 7,007,301 | B2 | 2/2006 | Crosbie et al. |
| 7,020,895 | B2 | 3/2006 | Albrecht |
| 7,024,690 | B1 | 4/2006 | Young et al. |
| 7,134,022 | B2 | 11/2006 | Flyntz |
| 7,260,596 | B1 | 8/2007 | Zhou |
| 7,302,700 | B2 | 11/2007 | Mao et al. |
| 7,334,254 | B1 | 2/2008 | Boydstun et al. |
| 2001/0023482 | A1 | 9/2001 | Wray |
| 2001/0044840 | A1 | 11/2001 | Carleton |
| 2001/0054159 | A1 | 12/2001 | Hoshino |
| 2002/0004847 | A1 | 1/2002 | Tanno |
| 2002/0029337 | A1 | 3/2002 | Sudia et al. |
| 2002/0032855 | A1 * | 3/2002 | Neves et al. ................ 713/154 |
| 2002/0078202 | A1 | 6/2002 | Ando et al. |
| 2002/0078354 | A1 | 6/2002 | Sandhu et al. |
| 2002/0078383 | A1 * | 6/2002 | Leerssen et al. ............. 713/201 |
| 2002/0083343 | A1 | 6/2002 | Crosbie et al. |
| 2002/0087882 | A1 | 7/2002 | Schneier et al. |
| 2002/0095496 | A1 * | 7/2002 | Antes et al. ................. 709/225 |
| 2002/0101332 | A1 | 8/2002 | Talmadge et al. |
| 2002/0103916 | A1 | 8/2002 | Chen et al. |
| 2002/0107953 | A1 | 8/2002 | Ontiveros et al. |
| 2002/0112185 | A1 | 8/2002 | Hodges |
| 2002/0129264 | A1 | 9/2002 | Rowland et al. |
| 2002/0133586 | A1 | 9/2002 | Shanklin et al. |
| 2002/0133698 | A1 | 9/2002 | Wank |
| 2002/0133721 | A1 | 9/2002 | Adjaoute |
| 2002/0136407 | A1 | 9/2002 | Denning et al. |
| 2003/0055994 | A1 | 3/2003 | Herrmann et al. |
| 2003/0074567 | A1 | 4/2003 | Charbonneau |
| 2003/0076794 | A1 | 4/2003 | Kawasaki et al. |
| 2003/0084331 | A1 | 5/2003 | Dixon et al. |
| 2003/0088791 | A1 | 5/2003 | Porras et al. |
| 2003/0229801 | A1 | 12/2003 | Kouznetsov et al. |
| 2004/0010712 | A1 * | 1/2004 | Hui et al. .................... 713/201 |
| 2004/0034771 | A1 | 2/2004 | Edgett et al. |
| 2004/0083286 | A1 | 4/2004 | Holden et al. |
| 2004/0107360 | A1 | 6/2004 | Herrmann et al. |
| 2004/0215771 | A1 * | 10/2004 | Hayes ........................ 709/225 |
| 2004/0233915 | A1 | 11/2004 | Lin |
| 2005/0273857 | A1 | 12/2005 | Freund |
| 2008/0098220 | A1 | 4/2008 | Spalink et al. |

OTHER PUBLICATIONS

Adolfo Rodriguez, John Gatrell, John Karas, Roland Peschke, "TCP/IP Tutorial And Technical Overview," Online, Aug. 2001, IBM Internet XP002276976, retrieved from the Internet, URL: WWW.IBM.COM/READBOOKS, retrieved on May 21, 2003, p. I-p. XVIII, p. 665-p. 780.

Hunt, R., "Internet/Intranet FirewallSecurity-Policy, Architecture And Transaction Services," Computer Communications, Butterworths & Co. Publishers Ltd., GB, vol. 21, No. 13, Sep. 1, 1998, pp. 1107-1123, XP004146571 ISSN: 0140-3664, p. 111, right-hand column, p. 1113, right-hand column, figures 2-4.

Phifer, "Cost-Effective Remote End Point Protection: Against Trojans, Spyware, and Other Pests," PestPatrol White Paper, Sep. 1, 2002, pp. 1-11.

Sungard, "Welcome to the Info Security Performance Model," SunGard Assessment Tool, Sep. 1, 2002, pp. 1-2.

Westbridge, "XML Web Services Security—Going Production," Westbridge White Paper, Sep. 1, 2002, pp. 1-7.

Top Layer, "Stopping Attacks: The Importance of Denial of Service (DoS) Security Appliances," Top Layer White Paper, pp. 1-13.

Internet Security, "Complete Desktop Protection for The Enterprise," ISS Technical White Paper, Sep. 1, 2002, pp. Cover, 1-6.

Internet Security, "Web Application Protection: Using Existing Protection Solutions," ISS Technical White Paper, Jul. 1, 2002, pp. Cover 1-6.

Top Layer, "Preventing Cyber Attacks and Costly Network Degradation," Top Layer Webcast, May 30, 2002, pp. 1-13 (slides), pp. 1-15 (transcript).

Okena, "A Primer on Preventing Attacks at the Host—Okena, Inc.—Hurwitz Report," Hurwitz Analyst White Paper, Feb. 1, 2002, pp. 1-11.

Blue Lance, "Protecting Computer-Managed Assets: Building a Secure Infrastructure for Business," Larstan Business Reports, Jan. 1, 2002, pp. 1-10.

Okena, "Technology Best Practices for Intrusion Prevention," Okena Analyst White Paper, Jan. 1, 2002, pp. 1-3.

Computel, "Distributed Denial of Service Attacks," Network Security White Papers, Dec. 6, 2000, pp. 1-6.

Leithauser, "Fire Guardian," KnolwdgeStorm Solution Detail Report, 2002, pp. 1-2.

Kobelt, "NetSentron," KnowledgeStorm Solution Detail Report, 202, pp. 1-3.

Internet Security, "RealSecure® SiteProtector for Enterprise Protection," KnowldgeStorm Solution Detail Report, 2002, pp. 1-5.

Internet Security, "BlackICE PC Protection," KnowledgeStorm Solution Detail Report, 2002, pp. 1-5.

Internet Security, "System Scanner®," KnowledgeStorm Solution Detail Report, 2002, pp. 1-5.

Internet Security, "Internet Scanner™," KnowledgeStorm Solution Detail Report, 2002, pp. 1-6.

Dynamics, "Webinspect™ (Web Application Security Assessment)," KnowledgeStorm Solution Detail Report, 2002, pp. 1-5.

Lockstep, Webagain—Automatic Web Site Repair, KnowledgeStorm Solution Detail Report, 2002, pp. 1-4.

Barham, et al., "Techniques for Lightweight Concealment and Authentication in IP Networks." Intel Research Berkley, Jul. 2002, pp. 1-12, IRB-TR-02-009, Intel Corp., U.S.A.

Badhusha, A.; Automatic signature files update in antivirus software using activepackets; Publication Date: 2001; ICS Dept., King Fahd Univ. of Pet. & Miner., Dhahran; On pp. 457-460.

* cited by examiner

| | 0 1 2 3 4 5 6 7 8 9 0 1 2 3 4 5 | 6 7 8 9 0 1 2 3 4 5 6 7 8 9 0 1 |
|---|---|---|
| IP Header | Version \| IHL \| Type of Service | Total Length |
| | Identification | Flags \| Fragment Offset |
| | Time to Live \| Protocol | Header Checksum |
| | Source Address | |
| | Destination Address | |
| | Options (optional) | |

TCP Header 510

| 0 1 2 3 | 4 5 6 7 | 8 9 0 1 2 3 4 5 | 6 7 8 9 0 1 2 3 4 5 6 7 8 9 0 1 |
|---|---|---|---|
| \multicolumn{3}{Source Port} | Destination Port |
| \multicolumn{4}{Sequence Number} |
| \multicolumn{4}{Acknowledgement Number} |
| Offset | Reserved | Flags | Window |
| \multicolumn{3}{Checksum} | Urgent Pointer |
| \multicolumn{4}{Options (optional)} |

FIG. 5B

IP Header

700

| Version | IHL | Type of Service | Total Length |
| --- | --- | --- | --- |
| Identification | | Flags | Fragment Offset |
| Time to Live | | Protocol | Header Checksum |
| Source Address | | | |
| Destination Address | | | |
| Options (optional) | | | |

ESTABLISHING SECURE TCP/IP COMMUNICATIONS USING EMBEDDED IDS

CROSS-REFERENCE TO RELATED APPLICATIONS

This application claims priority under 35 U.S.C. § 119 to U.S. Provisional Patent Application No. 60/767,387, entitled "Identity Private Network," filed Mar. 23, 2006, which is incorporated herein by reference in its entirety. This application also claims priority under 35 U.S.C. § 120 and is a continuation-in-part of U.S. patent application Ser. No. 10/644,632, entitled "System, Apparatuses, Methods, and Computer-Readable Media Using Identification Data in Packet Communications," filed Aug. 19, 2003, which claims priority to and is a continuation-in-part of U.S. patent application Ser. No. 10/065,775, entitled "System and Method for Intrusion Prevention in a Communications Network," filed Nov. 18, 2002. This application also claims priority under 35 U.S.C. § 120 and is a continuation-in-part of U.S. patent application Ser. No. 11/123,552, entitled "System, Apparatuses, Methods and Computer-Readable Media for Determining Security Status of Computer Before Establishing Connection Thereto," filed May 5, 2005, which claims priority under 35 U.S.C. § 119 to U.S. Provisional Patent Application No. 60/569,922, entitled "System, Apparatuses, Methods and Computer-Readable Media for Determining Security Status of Computer Before Establishing Connection Thereto," filed May 10, 2004. This application also claims priority under 35 U.S.C. § 120 and is a continuation-in-part of U.S. patent application Ser. No. 11/123,546, entitled "System, Apparatuses, Methods and Computer-Readable Media for Determining Security Status of Computer Before Establishing Connection Thereto," filed May 5, 2005, which claims priority under 35 U.S.C. § 119 to U.S. Provisional Patent Application No. 60/571,360, entitled "Apparatuses, Methods and Computer-Readable Media for Determining Security Status of Computer Before Establishing Connection Thereto," filed May 14, 2004. This application also claims priority under 35 U.S.C. § 120 and is a continuation-in-part of U.S. patent application Ser. No. 11/164,085, entitled "System, Apparatuses, Methods and Computer-Readable Media for Determining Security Realm Before Permitting Network Connection," filed Nov. 9, 2005, which claims priority under 35 U.S.C. § 119 to U.S. Provisional Patent Application No. 60/626,578, entitled "System, Apparatuses, Methods and Computer-Readable Media for Determining Security Realm Before Permitting Network Connection," filed Nov. 10, 2004. All of the above cited references are incorporated herein by reference in their entireties.

TECHNICAL FIELD

The present invention relates generally to the field of computer network security, and specifically to protecting the authenticity, integrity and confidentiality of network data communications as they occur between nodes on a computer network.

BACKGROUND

Many methods are in use for establishing secure communications between a source node and a destination node in a computer network, and many can be used specifically for TCP/IP network communications. These methods, however, rely on specially defined protocols to initiate and manage the secure communications.

One well-established method of secure communications for network traffic relies on the Secure Sockets Layer (SSL) protocol. The SSL protocol is widely used to secure communications traveling to and from portions of web applications where the data requires extra protection, using Hyper Text Transfer Protocol (HTTP) over SSL, commonly known as HTTPS. SSL is also a popular method in use as a means to secure communications within a Virtual Private Network (VPN) environment, commonly known as SSL VPN. In both situations (HTTPS and SSL VPN), the SSL protocol is used to establish and manage the secure communications, operating on top of the TCP/IP protocol. Specific destinations are configured to require SSL secure communications, and communications with those destinations are secured using SSL. SSL, along with its proposed successor Transport Layer Security (TLS), operates at Layer 5 of the Open Systems Interconnection (OSI) network protocol layer model, one layer above TCP and below the application protocol layer (where HTTP and other application protocols exist). SSL requires multiple handshake messages to be sent and received between a source node and a destination node to establish secure communications. SSL requires the source node to have an approved and verifiable certificate in order to secure communications with the destination node.

Another well-known and widely used method of secure communications for network traffic is Internet Protocol Security (IPsec), described in IETF RFCs 1825-1829 and then revised in RFCs 2401-2412 (a third generation of RFCs 4301-4309 now exist and are essentially a superset compared to 2401-2412). Like SSL, IPsec is widely used to secure communications within a VPN environment, commonly known as IPsec VPN. IPsec has also been applied to provide secure communications between nodes in internal network configurations. IPsec defines a protocol family that consists of two protocols, the Authentication Header (AH) protocol and the Encapsulated Security Payload (ESP) protocol, and IPsec takes the approach of modifying IP packet structure to insert AH or ESP headers into IP packets. One well-known problem with the modifications that IPsec makes to the IP packet header is that it is in many cases not compatible with Network Address Translation (NAT), which is very widely used in current IPv4 network configurations (a technique referred to as NAT-Traversal or NAT-T is used to help address this issue). The IPsec policies that define which communications to secure are stored in a Security Association Database (SAD) on each node. The security associations stored in the SAD typically rely on ports, protocols and IP addresses as identifiers for which communications to secure.

SUMMARY

The present invention provides systems and methods for protecting the authenticity, integrity and confidentiality of network data communications as they occur between nodes on a computer network. One embodiment provides for establishing secure TCP/IP communications for individual network connections between a source node and a destination node, the method comprising: intercepting a TCP SYN packet prior to transmission of the packet to the destination node, the packet including a packet header, and embedding unique identifiers into the packet header, wherein the unique identifiers are associated with a connection attempt between the source node and the destination node, and forwarding the TCP SYN packet with embedded identifiers to the destination node; intercepting the TCP SYN packet with embedded identifiers prior to arrival of the packet at the destination node, and determining whether secure communications are required;

upon determining that secure communications are required, refusing passage of the TCP SYN packet to the destination node and returning an embed signal RST packet to the source node, the RST packet including an identifier to indicate that secure communications are required; intercepting the RST packet prior to arrival of the packet at the source node, extracting the secure communications identifier and triggering secure communications for subsequent packets in either direction between the source node and the destination node; and encrypting outgoing packets between the source node and the destination node, and checking message integrity of the encrypted packet, and further decrypting incoming packets between the source node and the destination node, and checking message integrity of the decrypted packet.

Another embodiment provides for establishing secure TCP/IP communications for individual network connections between a source node and a destination node, the method comprising: intercepting a TCP SYN packet prior to arrival of the packet at the destination node, the TCP SYN packet including standard TCP header elements, and determining from at least one standard TCP header element whether secure communications are required; upon determining that secure communications are required, refusing passage of the TCP SYN packet to the destination node and returning an embed signal RST packet to the source node, the RST packet including an identifier to indicate that secure communications are required; intercepting the RST packet prior to arrival of the packet at the source node, extracting the secure communications identifier and triggering secure communications for subsequent packets in either direction between the source node and the destination node; and encrypting outgoing packets between the source node and the destination node, and checking message integrity of the encrypted packet, and further decrypting incoming packets between the source node and the destination node, and checking message integrity of the decrypted packet.

Another embodiment provides for establishing secure TCP/IP communications for individual network connections between a source node and a destination node, the method comprising: intercepting a TCP SYN packet prior to transmission of the packet to the destination node, the packet including a packet header, and embedding unique identifiers into the packet header, wherein the unique identifiers are associated with a connection attempt between the source node and the destination node, and forwarding the TCP SYN packet with embedded identifiers to the destination node; intercepting the TCP SYN packet with embedded identifiers prior to arrival of the packet at the destination node, and determining whether secure communications are required; upon determining that secure communications are required, allowing passage of the TCP SYN packet to the destination node, intercepting a SYN-ACK packet traveling from the destination node to the source node, embedding an identifier into the SYN-ACK packet header, the identifier indicating that secure communications are required, and sending the SYN-ACK packet with embedded identifier to the source node; intercepting the SYN-ACK packet prior to arrival of the packet at the source node, extracting the secure communications identifier and triggering secure communications for subsequent packets in either direction between the source node and the destination node; and encrypting outgoing packets between the source node and the destination node, and checking message integrity of the encrypted packet, and further decrypting incoming packets between the source node and the destination node, and checking message integrity of the decrypted packet.

Yet another embodiment provides for establishing secure TCP/IP communications for individual network connections between a source node and a destination node, the method comprising: intercepting a TCP SYN packet prior to arrival of the packet at the destination node, the TCP SYN packet including standard TCP header elements, and determining from at least one standard TCP header element whether secure communications are required; upon determining that secure communications are required, allowing passage of the TCP SYN packet to the destination node, intercepting a SYN-ACK packet traveling from the destination node to the source node, embedding an identifier into the SYN-ACK packet header, the identifier indicating that secure communications are required, and sending the SYN-ACK packet with embedded identifier to the source node; intercepting the SYN-ACK packet prior to arrival of the packet at the source node, extracting the secure communications identifier and triggering secure communications for subsequent packets in either direction between the source node and the destination node; and encrypting outgoing packets between the source node and the destination node, and checking message integrity of the encrypted packet, and further decrypting incoming packets between the source node and the destination node, and checking message integrity of the decrypted packet.

Other systems, methods, features and advantages of the present invention will be or become apparent to one with skill in the art upon examination of the following drawings and detailed description. It is intended that all such additional systems, methods, features and advantages be included within this description and be within the scope of the present disclosure.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIG. 5A shows the standard fields in the IP packet header.

FIG. 5B shows the standard fields in the TCP packet header.

FIG. 7A indicates the option field of the IP packet headers that are optionally utilized to embed identifiers in the TCP SYN, TCP SYN-ACK or TCP RST packet headers.

DETAILED DESCRIPTION

Figure 1:
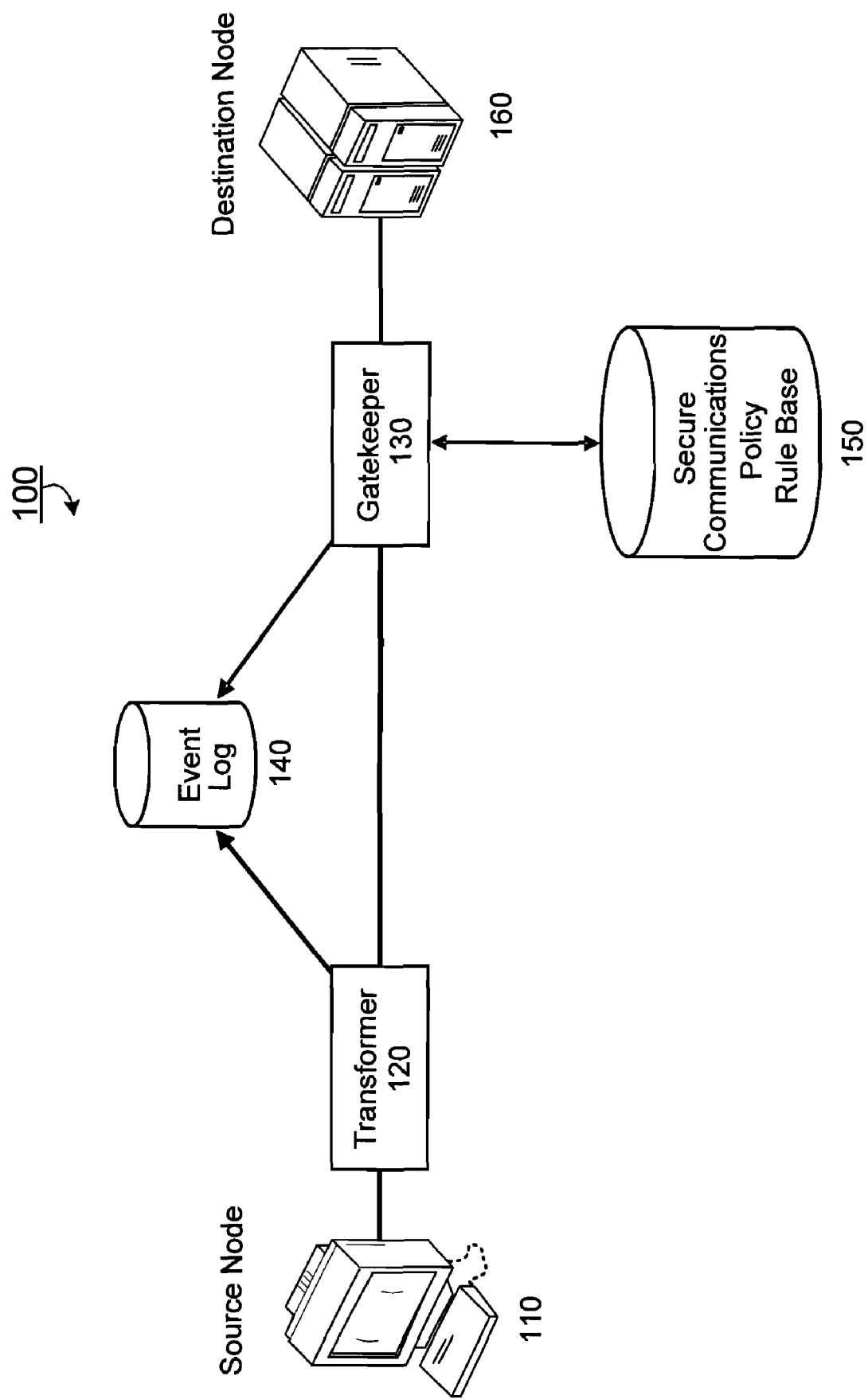
FIG. 1 shows a system for establishing secure TCP/IP communications between nodes on a computer network.

Reference is now made in detail to the description of the embodiments as illustrated in the drawings. The invention may, however, be embodied in many different forms and should not be construed as limited to the embodiments set forth herein; rather, these embodiments are intended to convey the general scope of the invention to those skilled in the art. Furthermore, all "examples" given herein are intended to be non-limiting.

The present invention provides systems and methods for protecting the authenticity, integrity and confidentiality of network data communications as they occur between nodes on a computer network. Determination is made, on a connection-by-connection basis, as to whether the connection requires secure communications, while considering (1) the identity of the user account previously authenticated and responsible for initiating the connection attempt, and (2) the identity of the computer hardware from which the connection attempt was initiated. Policy rules regarding secure communications are setup and ensured by user, role and device. One exemplary policy specifies that the CEO of the company should always have secure communications when connecting to the back-office servers. Another exemplary policy specifies that sales personnel at the company should always have secure communications when using their laptops. Another exemplary policy specifies that all PDAs in a company should use secure communications when connecting to back-office servers. These and other requirements are met while enabling and ensuring secure communications. The above policies are just a few of the unlimited types of policies that an organization may specify or desire to implement.

The present invention accounts for the identity of an authenticated user and the identity of the source node computer hardware in dynamically determining the policy for secure communications. The method allows the policy regarding secure communications to be stored and applied at or near the destination node, and does not rely on policy decisions to be made at the source nodes where security policy may be more easily exposed or compromised. Finally, the method relies on the standard connection handshake of the TCP/IP protocol for establishing secure communications, so that it will be efficient and compatible with conventional and currently existing network configurations, and so that secure communications can be established between a source node and a destination node before any connection is actually permitted.

Turning attention to the drawings, FIG. 1 illustrates an exemplary embodiment of a system 100 for protecting the authenticity, integrity and confidentiality of network data communications as they occur between nodes on a computer network. The system 100 includes a transformer 120 on or near a source node 110, a gatekeeper 130 on or near a destination node 160 of a network, a secure communications policy rule base 150, and an event log 140.

In one embodiment, the transformer 120 is a software component residing on the source node 110. In another embodiment, the transformer 120 is a software component residing on a separate device connected by the network to the source node 110. Similarly, in one embodiment, the gatekeeper 130 is a software component residing on the destination node 160. In another embodiment, the gatekeeper 130 is a software component residing on a separate device connected by the network to the destination node 160. In another embodiment, the transformer 120 and the gatekeeper 130 are specialized hardware devices residing in the source node 110 and destination node 160, respectively. In yet another embodiment, the transformer 120 and the gatekeeper 130 are specialized hardware devices residing separately from the source node 110 and the destination node 160. In yet another embodiment, the transformer 120 and the gatekeeper 130 are specialized hardware devices residing within other devices connected by the network to the source node 110 and the destination node 160. All of the above physical arrangements and other similar arrangements will be appreciated and understood by those skilled in the art.

The secure communications policy rule base 150 stores rules defining which users or devices require secure communications when connecting to specified destinations. One exemplary policy rule specifies that "John Smith requires secure communications when connecting to the financial server." Another exemplary policy rule specifies that "John Smith using his PDA requires secure communications when connecting to any server." Yet another exemplary policy rules specifies that "Any person using a PDA requires secure communications when connecting to the financial server."

In one embodiment, secure communications are established in a TCP/IP network by embedding information in TCP connection packet headers sent between the source node 110 and the destination node 160. Information embedded in the TCP connection headers includes a unique identifier associated with the authenticated user account responsible for initiating the connection attempt from the source node 110, or a unique identifier associated with the computer hardware at the source node 110. The embedded unique identifiers are compared to a secure communications policy rule base 150 to determine whether or not a connection requires secure communications. If a secure communication is required, secure communications are established by making use of additional normal functions in the TCP connection protocol.

Additional specialized protocols and structural modification are not required, such as the addition of fields or the change in size of fields, for the IP or TCP packet headers. A user account identifier and a computer hardware identifier are used to determine the appropriate policy for secure communications.

In one embodiment, the system makes advantageous use of the conventional TCP connection protocol three-part handshake, where a source node 110 transmits a TCP SYN packet to a destination node 160, the destination node 160 responds with a TCP SYN-ACK packet, and the source node 110 confirms with a TCP ACK packet. Also, in the case of failure for any reason in receiving the original TCP SYN packet, the destination node 160 responds with a TCP RST packet requesting that the source node 110 reset and retry the connection (i.e., issue a new TCP SYN).

A transformer 120 component resides on or near the source node 110, and intercepts TCP/IP data packets going out from or coming into the source node 110; a gatekeeper 130 component resides on or near the destination node 160, and intercepts TCP/IP packets coming into or going out from the destination node 160. The transformer 120 is responsible for embedding unique identifiers, including identifiers for the authenticated user account or the computer hardware at the source node, into TCP SYN packet headers. The gatekeeper 130 is then responsible for extracting the embedded identifiers from the TCP SYN packet headers, and comparing the embedded values, along with other information in the TCP SYN packet, to the secure communications policy rule base 150. In cases where policy rules indicate that a secure communication should be established for the network connection, the gatekeeper 130 component embeds information in the TCP SYN-ACK, or alternatively in a TCP RST, to signal back to the transformer 120 that secure communications are required. The transformer 120 intercepts the TCP SYN-ACK or TCP RST and examines the embedded information to determine if secure communications are required. If so, then both the transformer 120 and the gatekeeper 130 encrypt, decrypt and verify the integrity of the data field for each subsequent TCP packet that is part of that connection throughout the life of that connection.

In an alternative embodiment, the standard TCP header elements are utilized for determining whether secure communications are required. Rather than embedding unique identifiers in the TCP header, for example, the secure communications policy rule base contains data corresponding to the standard TCP element header information of the TCP SYN packet.

Figure 2:
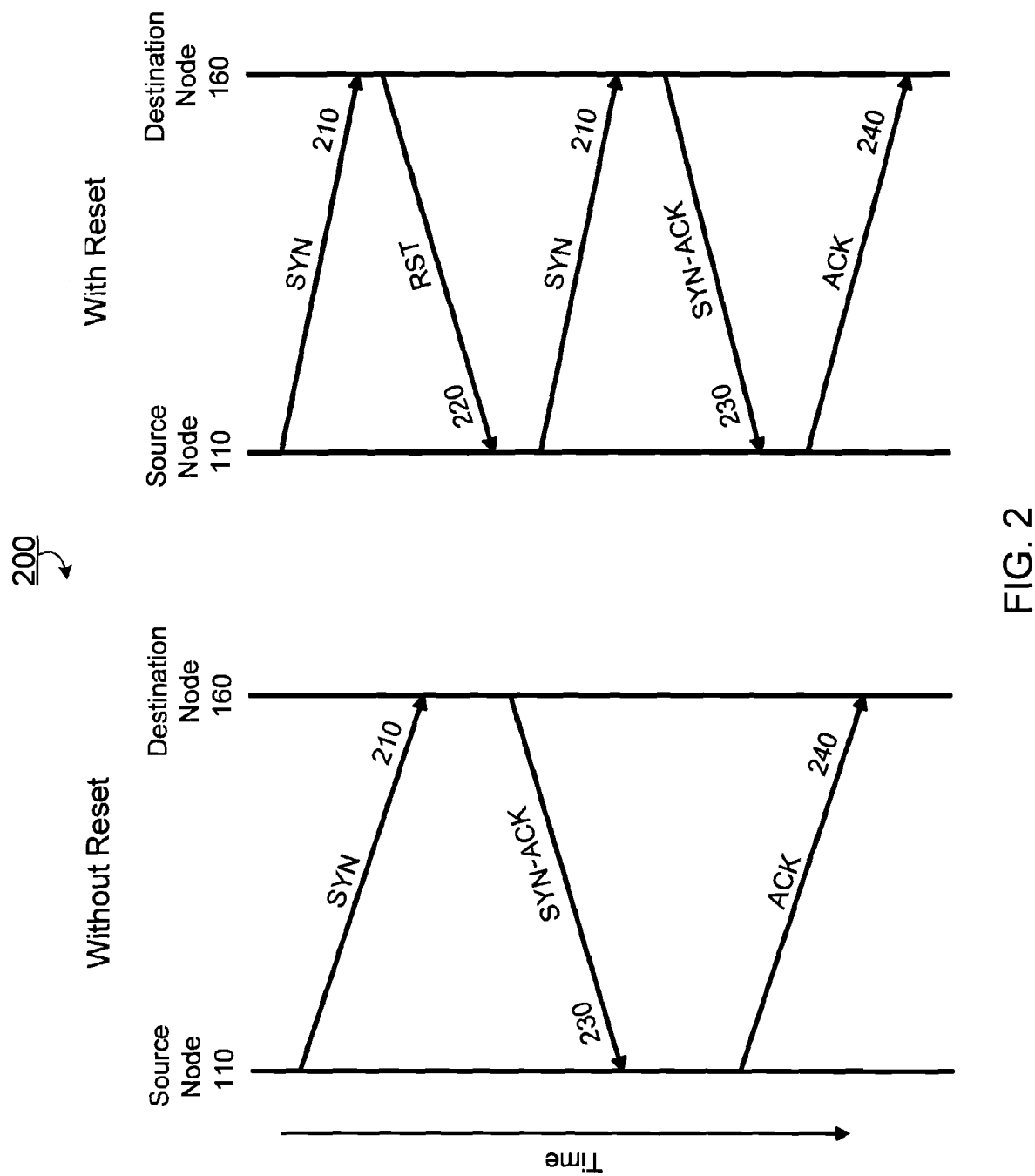
FIG. 2 illustrates an exemplary process for utilizing the standard TCP connection handshake sequences for the system of FIG. 1.

FIG. 2 illustrates exemplary TCP connection handshake sequences 200 for establishing secure communications. One embodiment establishes secure communications using the standard connection handshake of the TCP/IP protocol. The TCP connection handshake sequences are shown without reset in the left-hand column and with reset (RST) in the right-hand column.

The TCP connection protocol is a three-way handshake between the source node 110 and the destination node 160. As seen in both columns, the source node 110 first sends a TCP SYN 210 packet to the destination node 160 when attempting to establish a connection. If the destination node 160 is ready and able to accept the connection, it returns a TCP SYN-ACK 230 packet back to the source node 110 after receiving the TCP SYN 110 packet as shown in the left-hand column (without reset). Upon receiving a TCP SYN-ACK 230 packet, the source node 110 sends a TCP ACK 240 to the destination node 160 to confirm receipt. At this point, the connection is fully established, and the source node 110 and the destination node 160 communicate data packets until the source node 110 desires to complete the connection (at which point a similar handshake is used to tear down the connection).

The right-hand column of FIG. 2 describes the handshake process for circumstances where the destination node 160 may not be immediately able to accept a connection. Upon receiving a TCP SYN 210 from the source node 110, if the destination node 160 is unable to accept the connection and also willing to accept a retry, the destination node 160 returns a TCP RST 220 packet to the source node 110. Upon receiving a TCP RST 220, the source node 110 has the option of re-sending the TCP SYN 210 packet. As described above, if a TCP SYN 210 is "resent" and if the destination node 160 is ready and able to accept the connection, it returns a TCP SYN-ACK 230 packet back to the source node 110. The source node 110 then sends a TCP ACK 240 to the destination node 160 to confirm receipt. At this point, and as described above regarding the left-hand column, the connection is fully established, and the source node 110 and the destination node 160 communicate data packets until the source node 110 desires to complete the connection. As also noted above, a handshake is used to tear down the connection.

Since the TCP connection handshake involves back-and-forth communication between the source node 110 and the destination node 160, the connection handshake messages are used to advantage with the present system to communicate information necessary to determine the need for secure communications and to establish secure communications. This is accomplished without the need for additional protocol on top of TCP and without extensive modifications to TCP/IP packet headers to insert additional protocol headers. Further, with this approach, communication of information needed for secure communications at the TCP layer is more general than higher level protocols or application-specific secure communications, since such information can be communicated for any applications and higher level protocols that utilize TCP. Efficiency is also improved over other known systems because additional handshake messages between the source node 110 and the destination node 160 are not required, and further because structural modifications to the packet headers are not required. Also, compatibility with current network configurations and commonly used routing algorithms, such as NAT, is protected, since the contents of fields used in TCP packet routing are not changed or hidden, and the structure of the TCP packet headers is not modified.

For purposes of this specification, secure communications are those in which a destination node is able to verify that a communication is coming from an established and approved source node 110, and that both nodes are able to protect the integrity and the confidentiality of the data communicated through the network between the source node 110 and the destination node 160.

In one embodiment, secure communications are accomplished via public/private keys used to verify communications and establish shared secrets, data encryption and decryption utilizing a block cipher algorithm, message authentication using keyed hash message authentication codes, and session-based replay protection. Actual systems and methods used to secure the individual communications are conventional and beyond the scope of this specification, which focuses on the systems and methods for establishing secure communications rather than on the actual systems and methods of implementing such secure communications.

Figure 3:
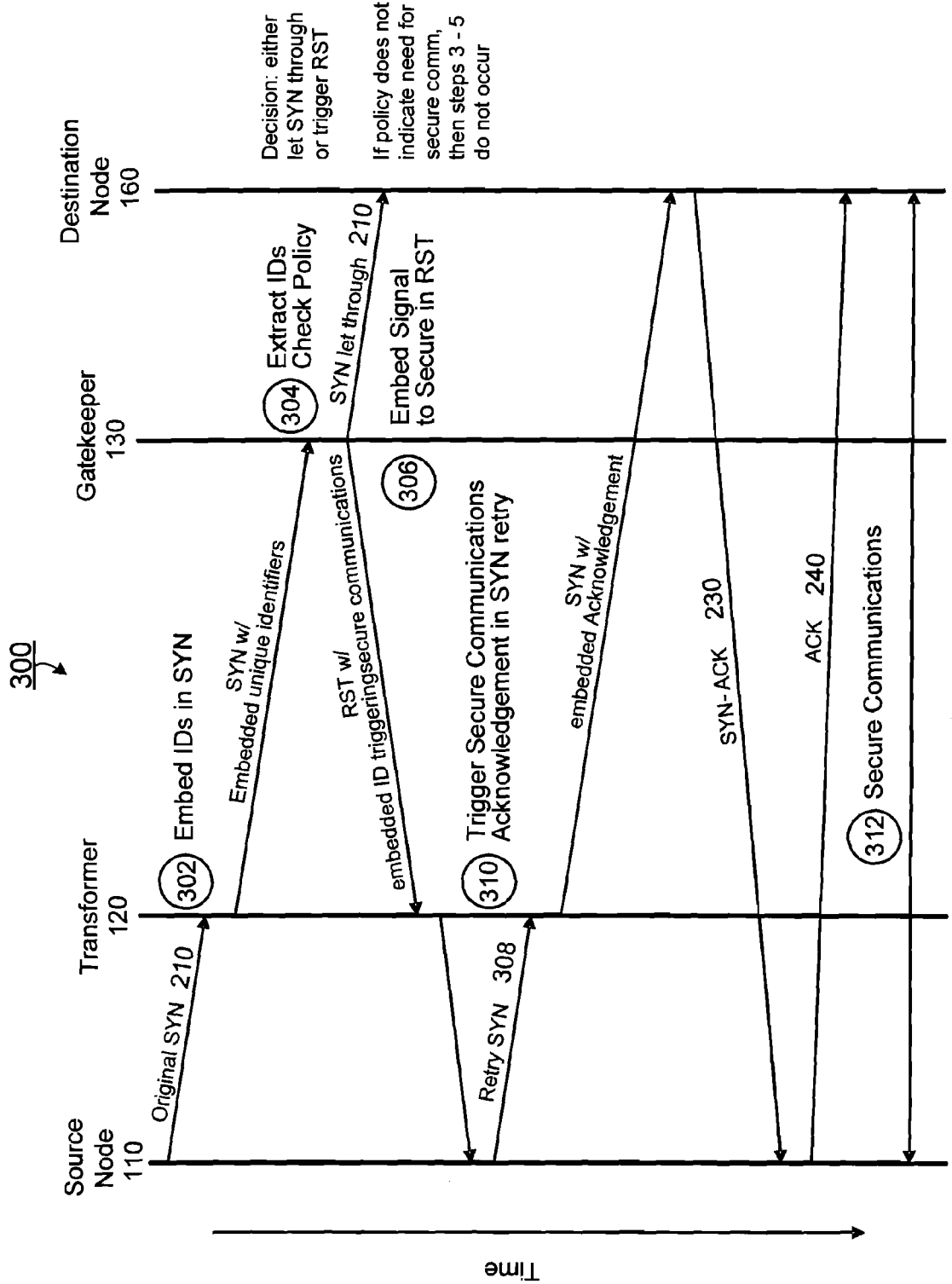
FIG. 3 illustrates an exemplary process for utilizing the standard TCP connection handshake mechanisms to establish secure communications for the system of FIG. 1.

FIG. 3 illustrates an exemplary process 300 for establishing secure communications between a source node 110 and a destination node 160 according to the present invention. As is conventional, the source node 110 first attempts to send a SYN 210 packet to the destination node 160. At step 302, the transformer 120 intercepts the SYN 210 packet after the packet is constructed on the source node 110, but before the packet is transmitted to the destination node 160, and embeds unique identifiers into the SYN packet header (Embed IDs in SYN). The transformer 120 obtains one or more unique identifiers associated with the connection attempt, such as but not limited to, a unique identifier for the user account responsible for initiating the connection attempt or a unique identifier associated with the computer hardware of the source node 110.

The transformer 120 determines the user account associated with the outgoing connection attempt to obtain the unique identifier for the user account. In one embodiment, available functions in the source node operating system are queried to provide user credentials associated with the process initiating the connection attempt. In another embodiment, a log from an authentication system is queried to provide user credentials associated with the process initiating the connection attempt. In yet another embodiment, a cache associating user account credentials with the source node is queried. Additionally, other similar methods for querying systems of files to obtain unique identifiers for the user account will be appreciated by those skilled in the art. Upon obtaining associated user account credentials, the transformer 120 determines a unique identifier for the user account either by dynamically generating the identifier, using an algorithm such as a CRC, or performing a look-up of a previously assigned identifier from a data store or cache.

Preferably, the transformer 120 also obtains a unique identifier for the computer hardware of the source node 110. In one embodiment, a fingerprint of the computer hardware is obtained through examination of static identifiers embedded in the hardware such as, for example, the CPU identifier, the hard disk drive identifiers, and/or the network interface card (NIC) addresses, among others, and combining the identifiers utilizing an algorithm such as, for example, a hash algorithm, to generate a unique fingerprint. It should be understood that an algorithm (other than a hash algorithm) could be used for generating the unique fingerprint. Upon generating the fingerprint, the transformer 120 either generates a unique hardware identifier, using an algorithm such as a CRC, or performs a lookup of a previously assigned identifier from a data store or cache.

Upon intercepting the outgoing SYN 210 connection packet from the source node 110 and obtaining one or more unique identifiers associated with the connection attempt, the transformer 120 embeds the unique identifiers into the SYN 210 packet header without modifying the data field and without changing the size of existing fields or adding new fields. Avoiding the change or addition of fields, as well as avoiding use of the data field, helps ensure smooth operation of the process 300 within existing TCP network implementations, common network configurations, and common networking devices. Further, the process 300 preserves settings of key IP and TCP routing fields such as source address, source port, destination address, destination port, and the flags fields, again helping to ensure normal routing and operations, and maintaining compatibility with NAT. (The standard fields and layouts of the IP and TCP packet headers are illustrated in FIG. 5A and FIG. 5B.)

In one embodiment, the transformer 120 embeds unique identifiers into fields of the TCP header. The unique identifiers are then manipulated on IP and TCP SYN packets in a manner that does not affect normal TCP/IP operations, as has been illustrated through testing in IPv4 networks. The fields include the identification field of the IP header, and the sequence number field, the acknowledgment number field, the urgent pointer field and a portion of the window field in the TCP header. Additionally, the transformer 120 takes steps to establish the authenticity of the embedded identifiers and protect the integrity and confidentiality of the identifiers. Thus, secure communications of the identifiers are essentially provided in the same manner as for the entire connections (public/private keys to verify communications and establish shared secrets, data encryption and decryption using a block cipher algorithm, message authentication using keyed-hash message authentication codes, and session-based replay protection).

Figure 6A:
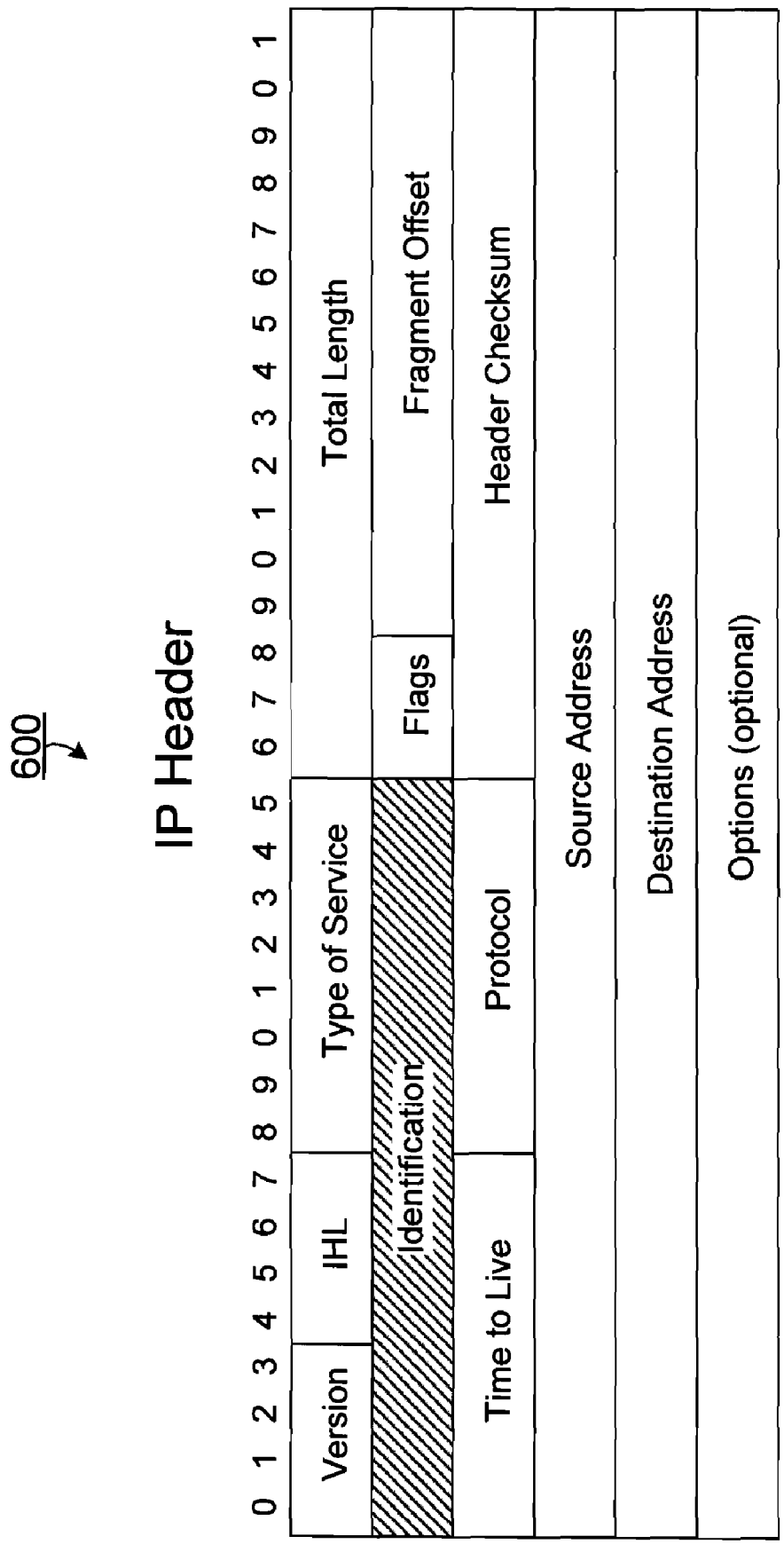
FIG. 6A shows which fields of the IP packet header are used embed identifiers in the TCP SYN, TCP SYN-ACK or TCP RST packet headers.
Figure 6B:
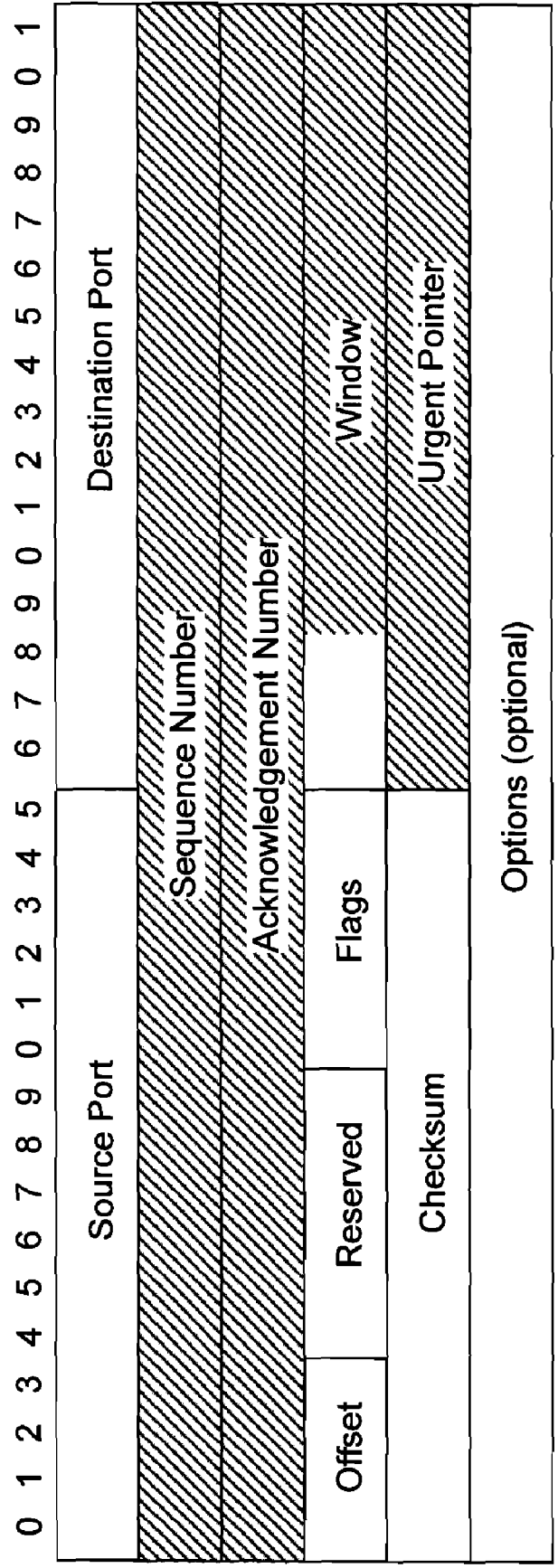
FIG. 6B shows which fields of the TCP packet header are used embed identifiers in the TCP SYN, TCP SYN-ACK or TCP RST packet headers.
Figure 7B:
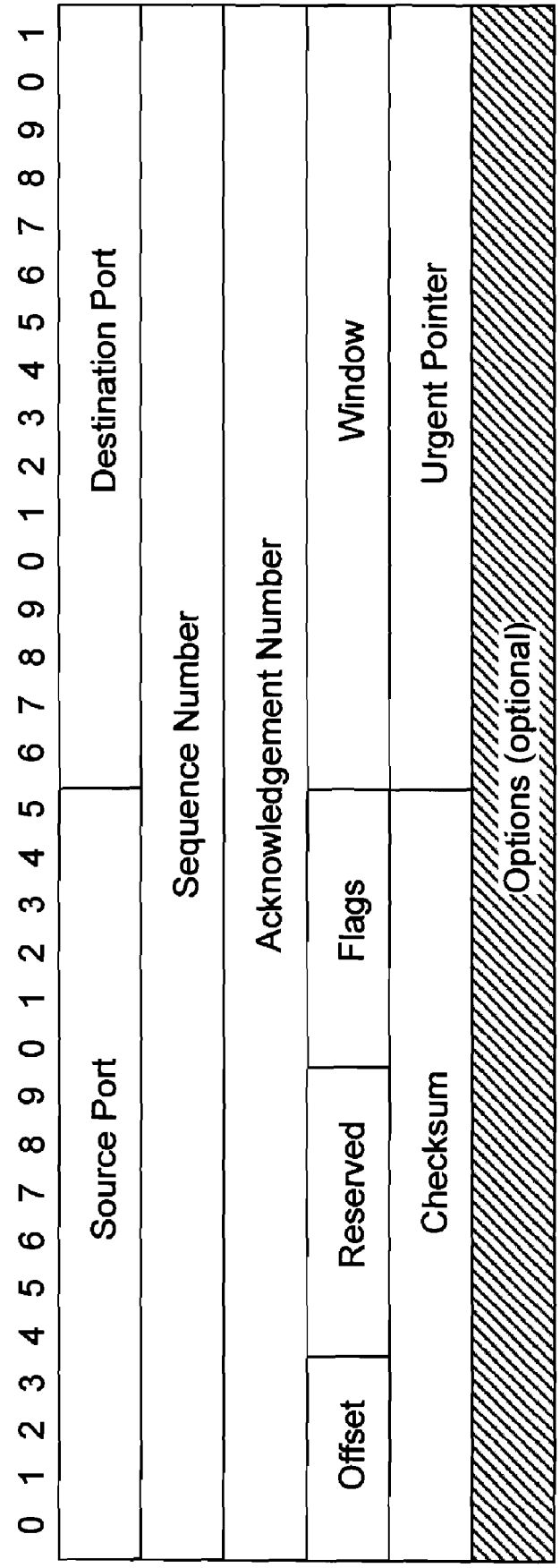
FIG. 7B indicates the option field of the TCP packet headers that are optionally utilized to embed identifiers in the TCP SYN, TCP SYN-ACK or TCP RST packet headers.

An alternative embodiment, the transformer 120 embeds information using the IP options or TCP options capabilities in the IP and TCP header. (See FIG. 7A and FIG. 7B.) Another alternative embodiment uses the fields identified in FIG. 6A and FIG. 6B, since some network devices and some TCP implementations are not compatible with unknown options; thus, practical application of the alternative approach, as in FIG. 7A and FIG. 7B, may be more difficult than using the fields of FIG. 6A and FIG. 6B.

Returning to FIG. 3, upon the transformer 120 embedding and possibly encrypting identifiers into a SYN packet, the gatekeeper 130 intercepts the SYN connection packet before arrival at the destination node 160 and determines whether secure communications are required. At step 304, the gatekeeper 130 extracts the unique identifiers (Extract IDs Check Policy) previously embedded into the packet headers by the transformer 120. If the identifiers are protected, the gatekeeper 130 decrypts the identifiers and compares them to any included message authentication code.

Upon obtaining the unique identifiers, the gatekeeper 130 utilizes the information provided by the unique identifiers, together with other information in the packet headers, to perform a lookup against the secure communications policy rule base 150. The secure communications policy rule base 150 indicates whether a particular connection requires secure communications. In one embodiment, the gatekeeper 130 attempts to match the identifiers extracted from the TCP SYN packet header against the secure communications policy rule base 150. For example, if the following is extracted from the packet headers: (i) a unique user identifier that corresponds to user account "John Smith" and (ii) a unique machine identifier that corresponds to computer hardware "JSmith Laptop," and the destination IP address of the packet header indicates address "10.10.2.43", and the secure communications policy rule base 150 indicates that: (a) all communications for "John Smith" should be secure, or (b) communications between "John Smith" and the destination address "10.10.2.43" should be secure, or (c) all communications from "JSmith Laptop" to any "10.10.*.*" address should be secure, then the gatekeeper 130 determines that the connection attempt requires a secure communication. On the other hand, if the secure communications policy rule base 150 does not contain such policy rules, then the gatekeeper 130 determines that the connection attempt does not require a secure communication.

If the gatekeeper 130 checks the secure communications policy rule base 150 and determines that the connection does not require secure communications, no further action is taken and the gatekeeper 130 permits the connection attempt to proceed toward the destination node 160. In such an instance, the SYN 210 passes through to the destination node 160 and neither the transformer 120 nor the gatekeeper 130 take further action regarding subsequent communications that are part of this specific connection.

Upon determining, via the secure communications policy rule base 150, that a connection attempt requires secure communications, the gatekeeper 130 takes two actions at step 306. First, the original SYN connection is not allowed to pass through to the destination node 160. Second, an embedded signal RST packet is returned to the source node 110, with an identifier embedded in the RST header to indicate to the transformer 120 that secure communications are required for this connection. The gatekeeper 130 utilizes the IP identification field and a portion of the TCP window field to store the information transmitted back to the transformer 120 regarding secure communications. (See FIG. 6A for IP header information and FIG. 6B for TCP header information.) This information may or may not be protected for integrity and confidentiality. Further, this information may or may not include additional information for the transformer 120 such as, for example, details on specific elements related to the secure communications, the encryption algorithms to use, the message authentication algorithms to use, or other details that might be reasonably used.

Upon the gatekeeper 130 embedding information indicating the need for secure communications in a TCP RST packet, the transformer 120 intercepts the returning packet and extracts the information from the packet header. As step 310 indicates, the transformer 120 uses this extracted information to toggle its internal state; thus, the transformer 120 provides or requires secure communications for subsequent packets that are part of the connection in either direction between the source node 110 and the destination node 160. The transformer 120 signals to the gatekeeper 130 that it has received and acknowledges the activation of secure communications for the connection by adding an additional identifier into the next outgoing packet from the source node 110 to the destination node 160, the newly generated SYN packet. The acknowledgment and confirmation from the transformer 120 to the gatekeeper 130 is performed using packet header fields shown in FIG. 6A and FIG. 6B.

By intercepting TCP connection packets traveling between the source node 110 and the destination node 160, and utilizing the standard elements of the TCP connection handshake and embedding information inside the packet headers, the need for secure communications during a connection is checked and, as in step 312, secure communications are established utilizing a transformer 120 and a gatekeeper 130. The need for secure communications is based on one or more unique identifiers that are added into the connection packets. Upon establishing that a particular connection requires secure communications, the transformer encrypts the data field on outgoing packets and checks message integrity. Further, the data field on incoming packets is decrypted and message integrity is also checked. Both the transformer 120 and the gatekeeper 130 continue to handle subsequent packets of the connection in the same manner, thereby fulfilling the requirement for secure communications.

Figure 4:
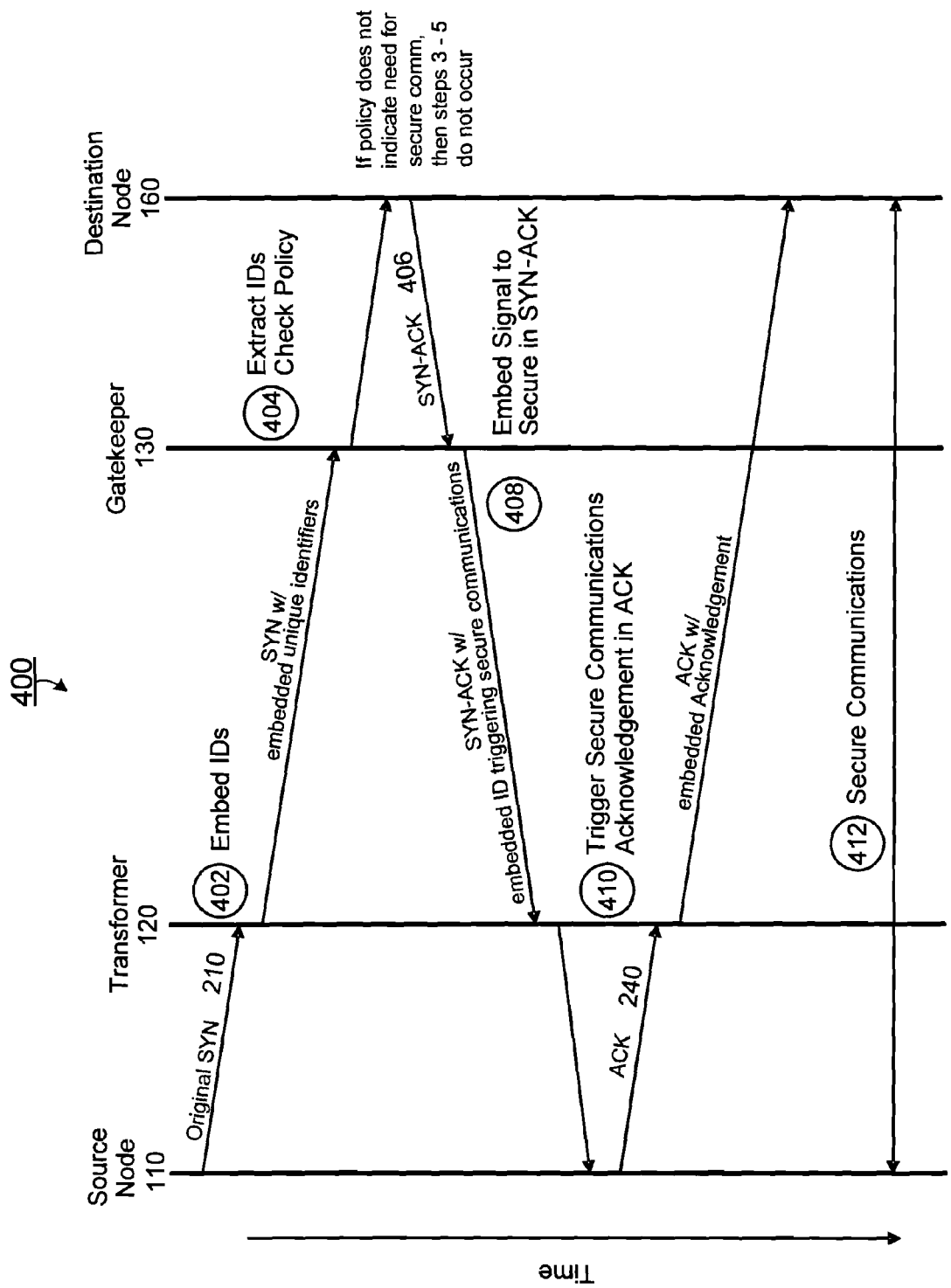
FIG. 4 illustrates an alternative exemplary process for utilizing the standard TCP connection handshake mechanisms to establish secure communications for the system of FIG. 1.

FIG. 4 illustrates an exemplary process 400 of an alternative embodiment for establishing secure communications between a source node 110 and a destination node 160, which does not use an RST. The process 400 proceeds as before with the source node 110 attempting to send a SYN 210 packet to the destination node 160. Step 402 corresponds to step 302 (FIG. 3) as the transformer 120 intercepts the SYN 210 packet and embeds unique identifiers into the SYN packet header. Unique identifiers are obtained as previously discussed. At step 404, the gatekeeper 130 intercepts the SYN packet prior to the packet's arrival at the destination node 160, and determines whether secure communications are required (as in step 304 of FIG. 3). At step 408, however, rather than using an RST to communicate the need for secure communications back to the transformer 120, the gatekeeper 130 utilizes the SYN-ACK 406 returned by the destination node 160 to the source node 110. The original SYN is allowed to pass through to the destination node 160, and the gatekeeper 130 intercepts and modifies the returning SYN-ACK 406 packet. Information is embedded in the SYN-ACK 406 packet header to indicate the need for secure communications.

Upon the gatekeeper 130 embedding information indicating the need for secure communications in a SYN-ACK packet, the transformer 120 intercepts the returning packet and extracts the information from the packet header. As step 410 indicates, the transformer 120 uses this extracted information to toggle its internal state; thus, the transformer 120 provides secure communications for subsequent packets that are part of the connection in either direction between the source node 110 and the destination node 160. The transformer 120 signals to the gatekeeper 130 that it has received and acknowledges the activation of secure communications for the connection by adding an additional identifier into the next outgoing packet from the source node 110 to the destination node 160, the newly generated ACK packet. The acknowledgment and confirmation from the transformer 120 to the gatekeeper 130 is performed using packet header fields shown in FIG. 6A and FIG. 6B.

In one embodiment, some or all steps of the process are recorded either by the transformer 120 or by the gatekeeper 130, or both, to a log file, to an audit database, or sent via a message, such as an SNMP message, to some other event message collector. The records or messages of these events are used to (1) provide a detailed audit history of connection records and secure communications, (2) confirm policy operations, (3) provide records for investigation of security breaches or compliance, or (4) alert network administrators of certain activities according to their preference and needs.

Accordingly, it will be understood that various embodiments of the present invention described herein are preferably implemented as a special purpose or general-purpose computer including various computer hardware as discussed in greater detail below. Embodiments within the scope of the present invention also include computer-readable media for carrying or having computer-executable instructions or data structures stored thereon. Such computer-readable media can be any available media which can be accessed by a general purpose or special purpose computer, or downloadable to through wireless communication networks. By way of example, and not limitation, such computer-readable media can comprise physical storage media such as RAM, ROM, flash memory, EEPROM, CD-ROM, DVD, or other optical disk storage, magnetic disk storage or other magnetic storage devices, any type of removable non-volatile memories such as secure digital (SD), flash memory, memory stick etc., or any other medium which can be used to carry or store computer program code in the form of computer-executable instructions or data structures and which can be accessed by a general purpose or special purpose computer, or a mobile device.

When information is transferred or provided over a network or another communications connection (either hardwired, wireless, or a combination of hardwired or wireless) to a computer, the computer properly views the connection as a computer-readable medium. Thus, any such a connection is properly termed and considered a computer-readable medium. Combinations of the above should also be included within the scope of computer-readable media. Computer-executable instructions comprise, for example, instructions and data which cause a general purpose computer, special purpose computer, or special purpose processing device such as a mobile device processor to perform one specific function or a group of functions.

Those skilled in the art will understand the features and aspects of a suitable computing environment in which aspects of the invention may be implemented. Although not required, the inventions will be described in the general context of computer-executable instructions, such as program modules, being executed by computers in networked environments. Such program modules are often reflected and illustrated by flow charts, sequence diagrams, exemplary screen displays, and other techniques used by those skilled in the art to communicate how to make and use such computer program modules. Generally, program modules include routines, programs, objects, components, data structures, etc. that perform particular tasks or implement particular abstract data types, within the computer. Computer-executable instructions, associated data structures, and program modules represent examples of the program code for executing steps of the methods disclosed herein. The particular sequence of such executable instructions or associated data structures represent examples of corresponding acts for implementing the functions described in such steps.

Those skilled in the art will also appreciate that the invention may be practiced in network computing environments with many types of computer system configurations, including personal computers, hand-held devices, multi-processor systems, microprocessor-based or programmable consumer electronics, networked PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the inventions, which is not illustrated, includes a general purpose computing device in the form of a conventional computer, including a processing unit, a system memory, and a system bus that couples various system components including the system memory to the processing unit. The computer will typically include one or more magnetic hard disk drives (also called "data stores" or "data storage" or other names) for reading from and writing to. The drives and their associated computer-readable media provide nonvolatile storage of computer-executable instructions, data structures, program modules, and other data for the computer. Although the exemplary environment described herein employs a magnetic hard disk, a removable magnetic disk, removable optical disks, other types of computer readable media for storing data can be used, including magnetic cassettes, flash memory cards, digital video disks (DVDs), Bernoulli cartridges, RAMs, ROMs, and the like.

Computer program code that implements most of the functionality described herein typically comprises one or more program modules may be stored on the hard disk or other storage medium. This program code, as is known to those skilled in the art, usually includes an operating system, one or more application programs, other program modules, and program data. A user may enter commands and information into the computer through keyboard, pointing device, or other input devices (not shown), such as a microphone, game pad, satellite dish, scanner, or the like. These and other input devices are often connected to the processing unit through known electrical, optical, or wireless connections.

The main computer that effects many aspects of the inventions will typically operate in a networked environment using logical connections to one or more remote computers or data sources, which are described further below. Remote computers may be another personal computer, a server, a router, a network PC, a peer device or other common network node, and typically include many or all of the elements described above relative to the main computer system in which the inventions are embodied. The logical connections between computers include a local area network (LAN), a wide area network (WAN), and wireless LANs (WLAN) that are presented here by way of example and not limitation. Such networking environments are commonplace in office-wide or enterprise-wide computer networks, intranets and the Internet.

When used in a LAN or WLAN networking environment, the main computer system implementing aspects of the invention is connected to the local network through a network interface or adapter. When used in a WAN or WLAN networking environment, the computer may include a modem, a wireless link, or other means for establishing communications over the wide area network, such as the Internet. In a networked environment, program modules depicted relative to the computer, or portions thereof, may be stored in a remote memory storage device. It will be appreciated that the network connections described or shown are exemplary and other means of establishing communications over wide area networks or the Internet may be used.

In view of the foregoing detailed description of preferred embodiments of the present invention, it readily will be understood by those persons skilled in the art that the present invention is susceptible to broad utility and application. While various aspects have been described in the context of a preferred embodiment, additional aspects, features, and methodologies of the present invention will be readily discernable therefrom. Many embodiments and adaptations of the present invention other than those herein described, as well as many variations, modifications, and equivalent arrangements and methodologies, will be apparent from or reasonably suggested by the present invention and the foregoing description thereof, without departing from the substance or scope of the present invention. Furthermore, any sequence(s) and/or temporal order of steps of various processes described and claimed herein are those considered to be the best mode contemplated for carrying out the present invention. It should also be understood that, although steps of various processes may be shown and described as being in a preferred sequence or temporal order, the steps of any such processes are not limited to being carried out in any particular sequence or order, absent a specific indication of such to achieve a particular intended result. In most cases, the steps of such processes may be carried out in a variety of different sequences and orders, while still falling within the scope of the present inventions. In addition, some steps may be carried out simultaneously. Accordingly, while the present invention has been described herein in detail in relation to preferred embodiments, it is to be understood that this disclosure is only illustrative and exemplary of the present invention and is made merely for purposes of providing a full and enabling disclosure of the invention. The foregoing disclosure is not intended nor is to be construed to limit the present invention or otherwise to exclude any such other embodiments, adaptations, variations, modifications and equivalent arrangements, the present invention being limited only by the claims appended hereto and the equivalents thereof.

What is claimed is:

1. A method for selectively requiring secure TCP/IP communications between a source node and a destination node within a computer network, the method comprising:

assigning a unique user identifier to each authorized user within the computer network;

creating a plurality of policy rules defining when secure communications are required for TCP/IP communications within the computer network as a function of the authorized users initiating the TCP/IP communications;

identifying the respective authorized user logged into the source node;

retrieving the unique user identifier associated with the respective authorized user;

upon initiation of a TCP/IP communication from the source node, intercepting by a first interceptor a TCP SYN packet of the TCP/IP communication prior to transmission of the TCP SYN packet to the destination node, wherein the packet includes a packet header;

embedding the unique user identifier into the packet header;

forwarding the TCP SYN packet with the embedded unique user identifier to the destination node;

intercepting by a second interceptor the TCP SYN packet with the embedded unique user identifier prior to arrival of the packet at the destination node;

determining whether secure communications are required for the respective authorized user logged into the source node by comparing the unique user identifier embedded in the TCP SYN packet header to the plurality of policy rules to identify a policy rule for the respective authorized user;

if secure communications are required for the respective authorized user logged into the source node based on an identified policy rule, refusing passage of the TCP SYN packet to the destination node and returning an embed signal RST packet to the source node, the RST packet including a secure communications identifier to indicate that secure communications are required;

intercepting by the first interceptor the RST packet and verifying the inclusion of the secure communications identifier; and thereafter requiring secure communications for all subsequent packets associated with the TCP/IP communication in either direction between the source node and the destination node until the TCP/IP communication is completed.

2. The method of claim 1, further comprising embedding a unique static computer identifier into the packet header, wherein the unique static computer identifier corresponds to specific computer hardware associated with the source node, and wherein the step of determining whether secure communications are required is further determined by comparing the unique static computer identifier to the plurality of policy rules to identify a policy rule for the specific computer hardware.

3. The method of claim 1, further comprising intercepting by the first interceptor the TCP SYN packet at the source node.

4. The method of claim 1, further comprising intercepting by the first interceptor the TCP SYN packet at a network location near the source node.

5. The method of claim 1, further comprising embedding the unique user identifier utilizing IP options in an IP header.

6. The method of claim 1, further comprising embedding the unique user identifier utilizing TCP options in a TCP header.

7. The method of claim 1, further comprising embedding the unique user identifier utilizing existing fields in an IP header.

8. The method of claim 1, further comprising embedding the unique user identifier utilizing existing fields in a TCP header.

9. A method for selectively requiring secure TCP/IP communications between a source node and a destination node within a computer network, the method comprising:

assigning a unique user identifier to each authorized user within the computer network;

intercepting by a first interceptor a TCP SYN packet associated with a TCP/IP communication prior to arrival of the packet at the destination node, the TCP SYN packet including a packet header with a unique user identifier embedded therein;

extracting the unique user identifier from the packet header of the TCP SYN packet;

determining whether secure communications are required for the respective authorized user associated with the TCP/IP communication based on the unique user identifier extracted from the TCP SYN packet header;

if secure communications are required for the respective authorized user associated with the TCP/IP communication, refusing passage of the TCP SYN packet to the destination node and returning an embed signal RST packet to the source node, the RST packet including a secure communications identifier to indicate that secure communications are required;

intercepting by a second interceptor the RST packet and verifying the inclusion of the secure communications identifier; and thereafter requiring secure communications for all subsequent packets associated with the TCP/IP communication in either direction between the source node and the destination node until the TCP/IP communication is completed.

10. The method of claim 9, further comprising determining whether secure communications are required by accessing the unique user identifier embedded in the packet header of the TCP SYN packet and performing a query for a corresponding entry in a secure communications policy rule base.

11. A method for selectively requiring secure TCP/IP communications between a source node and a destination node within a computer network, the method comprising:

assigning a unique user identifier to each authorized user within the computer network;

identifying the respective authorized user logged into the source node;

retrieving the unique user identifier associated with the respective authorized user;

upon initiation of a TCP/IP communication from the source node, intercepting by a first interceptor a TCP SYN packet of the TCP/IP communication prior to transmission of the TCP SYN packet to the destination node, wherein the packet includes a packet header;

embedding the unique user identifier into the packet header;

forwarding the TCP SYN packet with the embedded unique user identifier to the destination node;

intercepting by a second interceptor the TCP SYN packet with the embedded unique user identifier prior to arrival of the packet at the destination node;

determining whether secure communications are required for the respective authorized user logged into the source node based on the unique user identifier embedded in the packet header of the TCP SYN packet;

if secure communications are required for the respective authorized user logged into the source node, allowing passage of the TCP SYN packet to the destination node;

intercepting by the second interceptor a SYN-ACK packet traveling from the destination node to the source node;

embedding a secure communications identifier into the SYN-ACK packet header to indicate that secure communications are required;

sending the SYN-ACK packet with the embedded secure communications identifier to the source node;

intercepting by the first interceptor the SYN-ACK packet and verifying the inclusion of the secure communications identifier; and thereafter requiring secure communications for all subsequent packets associated with the TCP/IP communication in either direction between the source node and the destination node until the TCP/IP communication is finished.

12. The method of claim 11, wherein the unique user identifier corresponds to a user account associated with the respective authorized user logged into the source node.

13. The method of claim 11, further comprising embedding a unique static computer identifier into the packet header, wherein the unique static computer identifier corresponds to specific computer hardware associated with the source node, and wherein the step of determining whether secure communications are required is further based upon the unique static computer identifier.

14. The method of claim 11, further comprising intercepting by the first interceptor the TCP SYN packet at the source node.

15. The method of claim 11, further comprising intercepting by the first interceptor the TCP SYN packet at a network location near the source node.

16. The method of claim 11, further comprising embedding the unique user identifier utilizing IP options in an IP header.

17. The method of claim 11, further comprising embedding the unique user identifier utilizing TCP options in a TCP header.

18. The method of claim 11, further comprising embedding the unique user identifier utilizing existing fields in an IP header.

19. The method of claim 11, further comprising embedding the unique user identifier utilizing existing fields in a TCP header.

20. The method of claim 11, further comprising determining whether secure communications are required by extracting the unique user identifier from the header of the TCP SYN packet and comparing the unique user identifier to a secure communications policy rule base.

21. A method for selectively requiring secure TCP/IP communications between a source node and a destination node within a computer network, the method comprising:
  assigning a unique user identifier to each authorized user within the computer network;
  intercepting by a first interceptor a TCP SYN packet associated with a TCP/IP communication prior to arrival of the packet at the destination node, the TCP SYN packet including a packet header with a unique user identifier embedded therein;
  extracting the unique user identifier from the packet header of the TCP SYN packet;
  determining whether secure communications are required for the respective authorized user associated with the TCP/IP communication based on the unique user identifier extracted from the TCP SYN packet header;
  if secure communications are required for the respective authorized user associated with the TCP/IP communication, allowing passage of the TOP SYN packet to the destination node;
  intercepting by the first interceptor a SYN-ACK packet traveling from the destination node to the source node;
  embedding a secure communications identifier into the SYN-ACK packet header to indicate that secure communications are required;
  sending the SYN-ACK packet with the embedded secure communications identifier to the source node;
  intercepting by a second interceptor the SYN-ACK packet and verifying the inclusion of the secure communications identifier; and thereafter
  requiring secure communications for all subsequent packets associated with the TCP/IP communication in either direction between the source node and the destination node until the TCP/IP communication is finished.

22. The method of claim 21, further comprising determining whether secure communications are required by accessing the unique user identifier embedded in the packet header of the TCP SYN packet and performing a query for a corresponding entry in a secure communications policy rule base.

23. The method of claim 1, wherein the unique user identifier is embedded in a specific field of the packet header, wherein the specific field is selected from the group comprising: an identification field, a sequence (SEQ) number field, an acknowledgement number (ACK) field, an urgent pointer field, and a window field.

24. The method of claim 1, wherein the step of intercepting by the first interceptor the RST packet further comprises intercepting the RST packet prior to arrival of the RST packet at the source node.

25. The method of claim 1, wherein the step of intercepting by the first interceptor the RST packet further comprises intercepting the RST packet at the source node.

26. The method of claim 1, wherein the step of determining whether secure communications are required is further determined based on a resource or application at the destination node with which the respective authorized user is initiating TCP/IP communications.

27. The method of claim 1, wherein secure communications comprises encrypting packets between the source node and the destination node.

28. The method of claim 27, wherein secure communications further comprises checking message integrity of the encrypted packets between the source node and the destination node.

* * * * *